(12) United States Patent
Potemkin

(10) Patent No.: US 12,014,278 B1
(45) Date of Patent: Jun. 18, 2024

(54) METHOD FOR AUTOMATED PREDICTION OF USER DATA AND FEATURES USING A PREDICTIVE MODEL

(71) Applicant: LEMON ARTIFICIAL INTELLIGENCE LTD [IL]/[IL], Jerusalem (IL)

(72) Inventor: Rodion Potemkin, Tel-Aviv (IL)

(73) Assignee: LEMON ARTIFICIAL INTELLIGENCE LTD, Jerusalem (IL)

( * ) Notice: Subject to any disclaimer, the term of this patent is extended or adjusted under 35 U.S.C. 154(b) by 0 days.

(21) Appl. No.: 18/401,627

(22) Filed: Dec. 31, 2023

Related U.S. Application Data

(63) Continuation of application No. PCT/IB2023/053123, filed on Mar. 29, 2023.

(51) Int. Cl.
*G06N 3/084* (2023.01)
*G06N 3/02* (2006.01)
(Continued)

(52) U.S. Cl.
CPC .............. *G06N 3/084* (2013.01); *G06N 3/02* (2013.01); *G06N 3/042* (2023.01); *G06N 3/0455* (2023.01);
(Continued)

(58) Field of Classification Search
CPC ........... G06T 9/002; G06T 2207/20084; G06T 7/20; G06N 20/00; G06N 3/084; G06N 3/08; G06N 3/0464; G06N 3/02; G06N 3/0475; G06N 3/0455; G06N 3/094; G06N 3/042
See application file for complete search history.

(56) References Cited

U.S. PATENT DOCUMENTS 11,681,364 B1\* 6/2023 Zhang .................. G06N 3/0455
  345/156
2018/0197089 A1\* 7/2018 Krasser .................. G06N 20/10
(Continued)

OTHER PUBLICATIONS

Divya Singh, "Graph Neural Network with RNNs based trajectory prediction of dynamic agents for autonomous vehicle," Feb. 15, 2022, Applied Intelligence (2022) 52, pp. 12801-12810.\*
(Continued)

*Primary Examiner* — Omar S Ismail
(74) *Attorney, Agent, or Firm* — Chad Peterson

(57) ABSTRACT

The group of inventions relates to technologies for automated prediction of user data: actions and features using a predictive model. The technical result is to increase the efficiency of predicting user data. A method for automated prediction of user data is proposed. The method comprises the step of obtaining, by at least one processing unit, user action features, represented as an array of first vectors. Further, the method comprises obtaining user features represented as an array of second user feature vectors. Also, training neural network model on said arrays of first vectors and second vectors of features using an error backpropagation method to obtain trained model the output of which generates first and second latent state feature vectors, wherein said trainable neural network model is configured to dynamically select an architecture depending on said first and second feature vectors.

15 Claims, 4 Drawing Sheets

(51) Int. Cl.
G06N 3/042 (2023.01)
G06N 3/0455 (2023.01)
G06N 3/0464 (2023.01)
G06N 3/0475 (2023.01)
G06N 3/094 (2023.01)
G06N 20/00 (2019.01)
G06T 7/20 (2017.01)

(52) U.S. Cl.
CPC ......... *G06N 3/0464* (2023.01); *G06N 3/0475* (2023.01); *G06N 3/094* (2023.01); *G06N 20/00* (2019.01); *G06T 7/20* (2013.01); *G06T 2207/20084* (2013.01)

(56) References Cited

U.S. PATENT DOCUMENTS

| | | | |
|---|---|---|---|
| 2019/0005421 A1* | 1/2019 | Hammel | G06Q 10/06393 |
| 2019/0280868 A1* | 9/2019 | Streit | G06N 3/045 |
| 2020/0311480 A1* | 10/2020 | Sree Prakash | G06F 16/56 |
| 2020/0351097 A1* | 11/2020 | Streit | H04L 9/008 |
| 2021/0141896 A1* | 5/2021 | Streit | G06V 40/40 |
| 2021/0157312 A1* | 5/2021 | Cella | G01M 13/045 |
| 2021/0303798 A1* | 9/2021 | Duong | H04L 51/02 |
| 2021/0365965 A1 | 11/2021 | Shrivastava et al. | |
| 2021/0374525 A1* | 12/2021 | Bremer | G06F 18/214 |
| 2022/0058489 A1 | 2/2022 | Volkovs et al. | |
| 2022/0100896 A1* | 3/2022 | Streit | G06F 18/21355 |
| 2022/0147602 A1* | 5/2022 | Streit | G06N 3/08 |
| 2022/0147607 A1* | 5/2022 | Streit | G06V 10/806 |
| 2022/0150068 A1* | 5/2022 | Streit | G06V 40/50 |
| 2022/0277064 A1* | 9/2022 | Streit | G06V 40/172 |
| 2022/0284574 A1* | 9/2022 | Wagner | C12M 47/04 |
| 2022/0398605 A1 | 12/2022 | Chen et al. | |
| 2023/0031050 A1 | 2/2023 | Chauhan et al. | |
| 2023/0039728 A1* | 2/2023 | Shonibare | G06Q 50/22 |
| 2023/0065504 A1* | 3/2023 | Wagner | C12M 41/36 |
| 2023/0098602 A1* | 3/2023 | Cella | G06Q 10/087 700/248 |
| 2023/0102048 A1* | 3/2023 | Cella | B25J 9/1661 700/248 |
| 2023/0124697 A1* | 4/2023 | Eidelman | G06F 40/30 705/14.66 |
| 2023/0146390 A1* | 5/2023 | Sadaka | G06T 5/60 345/611 |
| 2023/0147063 A1* | 5/2023 | Kim | G06T 15/503 382/299 |
| 2023/0197271 A1* | 6/2023 | Molero Leon | G16H 70/60 705/2 |
| 2023/0222531 A1* | 7/2023 | Cella | G06Q 10/06315 705/7.31 |
| 2023/0351215 A1* | 11/2023 | Sun | G06N 5/022 |
| 2023/0402180 A1* | 12/2023 | Molero Leon | G06N 3/08 |

OTHER PUBLICATIONS

Eva Patel, "A hybrid CNN-LSTM model for predicting server load in cloud computing," Jan. 22, 2022, The Journal of Supercomputing (2022) 78, pp. 10329-10340.*

Christopher P. Kohara, "A machine learning framework for accelerating the design process using CAE simulations: An application to finite element analysis in structural crashworthiness," Jul. 13, 2021, Comput. Methods Appl. Mech. Engrg. 385 (2021) 114008, pp. 1-15.*

Saptarshi Sengupta, "A review of deep learning with special emphasis on architectures, applications and recent trends," Feb. 6, 2020, Knowledge-Based Systems 194 (2020), pp. 1-9.*

B. Ravi Kiran, "An Overview of Deep Learning Based Methods for Unsupervised and Semi-Supervised Anomaly Detection in Videos," Feb. 7, 2018,J. Imaging 2018, 4, 36, pp. 1-17.*

Sibo Cheng, "Generalised Latent Assimilation in Heterogeneous Reduced Spaces with Machine Learning Surrogate Models," Dec. 1, 2022, Journal of Scientific Computing (2023) 94, pp. 1-20.*

Anthony Thomas, "Hierarchical and Distributed Machine Learning Inference Beyond the Edge," Jun. 24, 2019, 2019 IEEE 16th International Conference on Networking, Sensing and Control (ICNSC), pp. 18-21.*

Weilin Guo, "Machine-Learning based methods in short-term load forecasting," Dec. 10, 2020, The Electricity Journal 34 (2021), pp. 1-4.*

Lei Liu, "Channel State Information Prediction for Adaptive Underwater Acoustic Downlink OFDMA System: Deep Neural Networks Based Approach," Sep. 17, 2021, IEEE Transactions on Vehicular Technology, vol. 70, No. 9, Sep. 2021, pp. 9063-9070.*

Machine-Learning based methods in short-term load forecasting; The Electricity Journal 34.1 (2021): 106884#; Retrieved from the Internet :<URL: https://www.sciencedirect.com/ science/article/pii/ S1040619020301767># Guo, Weilin, et al. (Dec. 10, 2020).

Written Opinion of the International Search Authority for PCT/IB2023/053123.

* cited by examiner

| Characteristics of the target metric | Dataset | R2 benchmark models | MAE benchmark models | Prediction model R2 | Prediction model MAE | % changes R2 | % changes MAE |
|---|---|---|---|---|---|---|---|
| First user data prediction 1 month after app A installed | 1 | 0,481 | 3707 | 0,496 | 1780 | 3,12 | -51,98 |
| First user data prediction 3 month after app A installed | 2 | 0,349 | 1673 | 0,394 | 1390 | 12,89 | -16,92 |
| First user data prediction 1 month after app B installed | 3 | 0,141 | 2,19 | 0,217 | 2,01 | 53,9 | -8,22 |
| Second user data prediction 14 days after app C installed | 4 | 0,474 | 375 | 0,512 | 271 | 8,02 | -27,73 |
| Second user data prediction 3 months after app C installed | 5 | 0,284 | 2303 | 0,396 | 2519 | 39,44 | 9,38 |
| | Average value | | | | | 23,474 | -19,094 |

Fig. 3

METHOD FOR AUTOMATED PREDICTION OF USER DATA AND FEATURES USING A PREDICTIVE MODEL

CROSS REFERENCE TO RELATED APPLICATIONS

The present application is a continuation of PCT Application No. PCT/IB2023/053123, entitled "Method for automated prediction of user data and features using a predictive model," filed Mar. 29, 2023, which is incorporated by reference herein in its entirety.

FIELD OF THE INVENTION

Implementations of the invention generally relate to technologies for prediction of user data: actions and features, and, more specifically, to systems and methods for automated prediction of user data: actions and features, using a predictive model.

BACKGROUND

User data is currently being used to make predictions using a predictive model.

First, all existing approaches to predicting user data, by some algorithmic (i.e. non-trainable) method, aggregate data about user behavior, and then, using vector-to-vector models, they are trained to predict the desired metric. For example, the time spent by the user on the site, the goods that he looked at, the events that he made, etc. are considered. However, all these features of the user are taken in various prediction methods separately from the very sequence of the user's actions, separately from time. Or, on the contrary, various existing methods take into account only the sequence of user actions, similarly limiting the ability of the model to predict user metrics. At best, when obtaining a result, existing methods rely on separate predictions of a model trained on user vectors and a model trained on their actions. The main thing is that in the process of training each of the models, the error backpropagation occurs in isolation, which limits the set of metrics and/or data on which the model can be correctly trained.

Using the proposed approach makes it possible not to throw out part of the data due to the fact that it must be folded into a vector, but to fully and "close to how it was in reality" transfer data about user behavior to the neural network model, thus effectively training it. Moreover, the error backpropagation method is simultaneously applied to the part of the model that analyzes the vectors of users, and to the part of the model that analyzes the sequence of their actions, which has a synergistic effect on the ability of each separate part to interpret data and predict metrics. The present invention describes the automated prediction of user data, not only features, but also actions, using a predictive model.

SUMMARY OF THE INVENTION

The proposed technology is aimed at achieving the following technical results:
  Expanding the functionality of implementation of automated prediction of user data: actions and features, using a predictive model.
  Thanks to the proposed technology, the prediction of user data is improved.
  Enabling efficient prediction of user data by training at least one neural network model on said combined first and second latent state vectors using an error backpropagation method.
  Providing automated prediction of user data, by training neural network models basing on user data: actions and features, using a predictive model.

These technical results are achieved through the proposed method for automated prediction of user data, comprising at least the following steps:
  obtaining, by at least one processing unit, user action features, represented as an array of first vectors;
  obtaining, by at least one processing unit, user features represented as an array of second user feature vectors;
  training at least one neural network model on said arrays of first vectors and second vectors of features using the error backpropagation method to obtain at least one trained model the output of which generates at least one first and second latent state feature vectors, wherein said at least one trainable neural network model is configured to dynamically select an architecture depending on said first and second feature vectors;
  combining, by at least one processing unit, said arrays of first and second latent state feature vectors;
  creating and training at least one neural network model on said combined first and second latent state vectors, using the error backpropagation method, wherein said at least one neural network model is configured to dynamically select an architecture depending on said combined first and second latent state feature vector;
  wherein, the choice of architecture depends on one or more of:
  dimensions of the obtained vectors; distribution of features contained in the vectors;
  displaying, by means of at least one processing unit, data of said combined first and second vectors of latent state features by a given encoding algorithm, depending on the type of said data and the number of unique values obtained, with the creation of an encoder made in the form of at least one neural network model, actions of at least one user based on the features of actions performed by at least one user; and
  performing automated prediction of the user action metric by means of the obtained predictive model of actions of at least one user.

According to the first embodiment of the invention, the user action feature vector contains at least such values as mobile measurement platform (MMP) ID associated with a user who performed the action; the name of the action; the time of the action; the type of network used during the action; the number of seconds from determining this action; action dynamic parameters.

In yet another implementation, the user feature vector contains at least such values as the user-associated MMP ID; application ID; the number of days the user logged into the application; the total number of user actions; the number of seconds elapsed from the moment the application was installed till the last user action in the application; the number of times a set of the most popular actions in the application was performed.

Moreover, in yet another embodiment, the architecture of said at least one neural network model is dynamically selectable from the trainable neural network models, such as, for example, fully connected neural network models and/or recurrent neural network models and/or Transformer type neural network models or target sets of neural network layers capable of executing at least vector-to-vector and/or sequence-to-vector and/or sequence-to-sequence operations.

In yet another implementation, the user action features encoder is configured to receive arrays of second latent state vectors as input.

These technical results are also achieved through the proposed automated user data prediction system containing memory;

at least one memory-associated processing unit configured to perform at least the following actions, including:

obtaining user action features represented as an array of first vectors;

obtaining user features represented as an array of second user feature vectors;

training at least one neural network model on said arrays of first vectors and second vectors of features using the error backpropagation method to obtain at least one trained model the output of which generates at least one first and second latent state feature vectors, wherein said at least one trainable neural network model is configured to dynamically select an architecture depending on said first and second feature vectors;

combining said arrays of first and second latent state feature vectors;

creating and training at least one neural network model on said combined first and second latent state vectors, using the error backpropagation method, wherein said at least one neural network model is configured to dynamically select an architecture depending on said combined first and second latent state feature vector;

wherein, the choice of architecture depends on one or more of:

dimensions of the obtained vectors; distribution of features contained in vectors;

displaying data of said combined first and second vectors of latent state features by a given encoding algorithm, depending on the type of said data and the number of unique values obtained, with the creation of an encoder made in the form of at least one neural network model, actions of at least one user based on the features of actions performed by at least one user; and performing automated prediction of the user action metric by means of the obtained predictive model of actions of at least one user.

In accordance with the first embodiment of the invention, the user action feature vector contains at least such values as mobile measurement platform (MMP) ID associated with a user who performed the action; the name of the action; the time of the action; the type of network used during the action; the number of seconds from determining this action; action dynamic parameters.

In yet another implementation, the user feature vector contains at least such values as the user-associated MMP ID; application ID; the number of days the user logged into the application; the total number of user actions; the number of seconds elapsed from the moment the application was installed till the last user action in the application; the number of times a set of the most popular actions in the application was performed.

Moreover, in yet another embodiment, the architecture of said at least one neural network model is dynamically selectable from the trainable neural network models, such as, for example, fully connected neural network models and/or recurrent neural network models and/or Transformer type neural network models or target sets of neural network layers capable of executing at least vector-to-vector and/or sequence-to-vector and/or sequence-to-sequence operations.

In yet another implementation, the user action features encoder is configured to receive arrays of second latent state vectors as input.

These technical results are also achieved by a non-transitory computer-readable storage medium containing instructions to be executed by at least one processing unit, which, when executed by said at least one processing unit, cause automated prediction of user data through at least such actions as including:

a) obtaining user action features represented as an array of first vectors;

obtaining user features represented as an array of second user feature vectors;

training at least one neural network model on said arrays of first vectors and second vectors of features using the error backpropagation method to obtain at least one trained model the output of which generates at least one first and second latent state feature vectors, wherein said at least one trainable neural network model is configured to dynamically select an architecture depending on said first and second feature vectors;

combining said arrays of first and second latent state feature vectors;

creating and training at least one neural network model on said combined first and second latent state vectors, using the error backpropagation method, wherein said at least one neural network model is configured to dynamically select an architecture depending on said combined first and second latent state feature vector;

wherein, the choice of architecture depends on one or more of:

dimensions of the obtained vectors; distribution of features contained in vectors;

displaying data of said combined first and second vectors of latent state features by a given encoding algorithm, depending on the type of said data and the number of unique values obtained, with the creation of an encoder made in the form of at least one neural network model, actions of at least one user based on the features of actions performed by at least one user; and performing automated prediction of the user action metric by means of the obtained predictive model of actions of at least one user.

According to the first embodiment of the invention, the user action feature vector contains at least such values as mobile measurement platform (MMP) ID associated with a user who performed the action; the name of the action; the time of the action; the type of network used during the action; the number of seconds from determining this action; action dynamic parameters.

In yet another implementation, the user feature vector contains at least such values as the user-associated MMP ID; application ID; the number of days the user logged into the application; the total number of user actions; the number of seconds elapsed from the moment the application was installed till the last user action in the application; the number of times a set of the most popular actions in the application was performed.

Moreover, in yet another embodiment, the architecture of said at least one neural network model is dynamically selectable from the trainable neural network models, such as, for example, fully connected neural network models and/or recurrent neural network models and/or Transformer type neural network models or target sets of neural network layers capable of executing at least vector-to-vector and/or sequence-to-vector and/or sequence-to-sequence operations.

In yet another implementation, the user action features encoder is configured to receive arrays of second latent state vectors as input.

IMPLEMENTATION OF THE INVENTION

The invention may be better understood by the detailed description given below and by the accompanying illustrations showing various applications of the invention. The illustrations, however, should not be taken as the only possible applications of the invention, but are provided for explanation and understanding only.

FIG. 3 shows an example of one of the possible implementations of a comparative analysis of the automated user data prediction system and the Deep Learning Inference Benchmark system.

Figure 1:
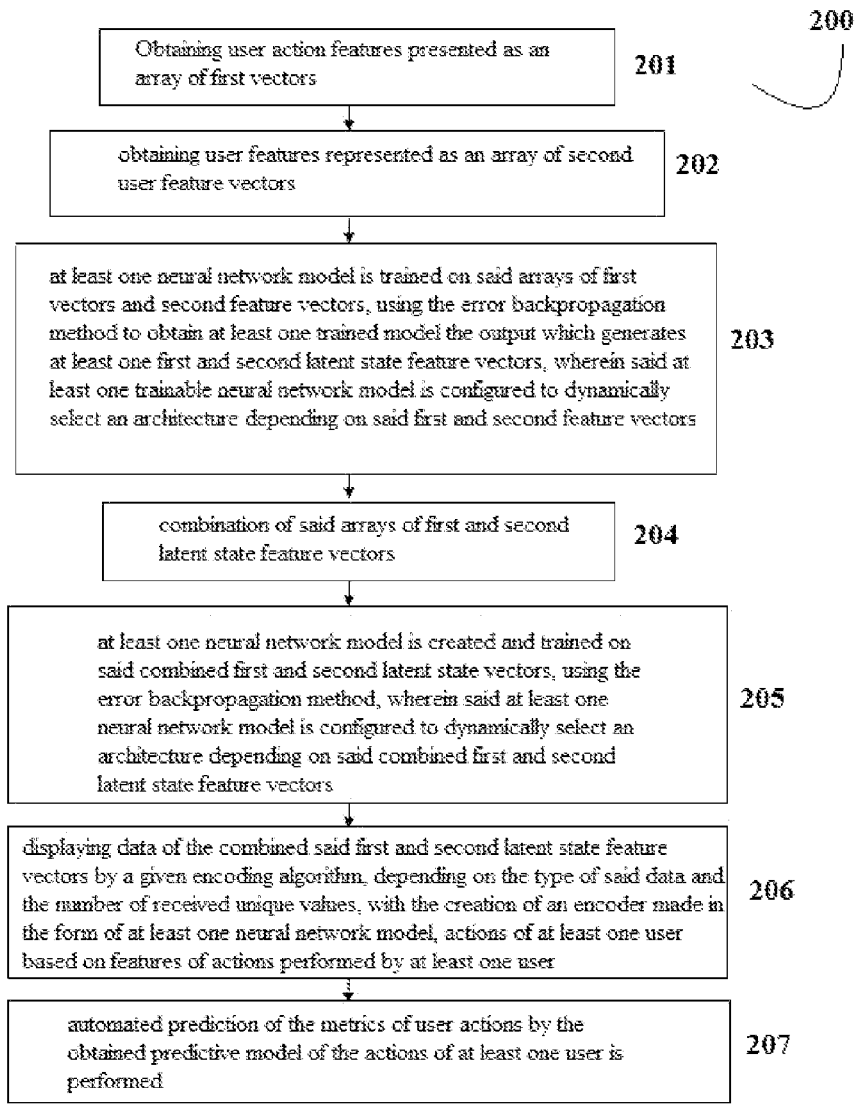
FIG. 1 shows a diagram of the organization of a method for automated prediction of user data.

The proposed technology makes it possible to optimize, as well as analyze more deeply the actions of users on the Internet.

The proposed technologies also make it possible to predict any deep actions and metrics of the user. At least the following data can be used as user metrics and/or actions: performance marketing metrics, such as: Monthly Recurring Revenue (MRR) "monthly revenue" is the total income received by the company per month; Retention Rate (RR)— retention rate; Lifetime value (LTV) is the company's profit received from one client for the entire time of cooperation with him; return on investment (ROI) ratio; Customer Acquisition Cost (CAC) is the cost of attracting a client; Average Order Value (AOV) is average check; Daily Active Users (DAU) is the number of unique users per day, and many others. This list can be continued, since a specific set of metrics depends on the characteristics of the business. Metrics can be predicted in a fairly short period of time (1-5 days), which allows you to get the most profitable users at optimal costs.

Predictions are generated by deep machine learning models created and trained on user behavior data for each individual business process layer.

Metrics can be predicted in a fairly short period of time (1-5 days), which makes it possible to get the most profitable users at optimal costs.

Predictions are generated by deep machine learning models created and trained on user behavior data for each individual business process layer.

Further, predictions can be sent to various data analysis systems in the form of user events, which makes the transition to the use of the proposed methods and systems from normal user actions as simple as possible.

In recurrent neural networks, a sequence of inputs gives a sequence of outputs, the so-called sequence to sequence. For example, calculating onion prices for the last 30 days and predicting the price tomorrow. Sequence-to-Sequence is very useful for time series prediction, natural language processing, etc. A sequence of inputs is given and only the last output is taken, which is therefore called Sequence-to-Vector. An example would be to review a movie on the Internet Movie Database (IMDB) and prediction of all the output data in the middle to predict a horror or drama movie. Each time the same input vector is given multiple times and the output is obtained, hence it is called vector-to-sequence. This is useful for example in a Convolutional Neural Network (CNN) where one inputs an image and waits to predict what the image is. The sequence-to-vector transformation network is called an encoder, and the vector-to-sequence transformation network is called a decoder.

The proposed technologies can be used for such models of neural networks, for example, such as: models of fully connected neural networks and/or models of recurrent neural networks and/or models of neural networks of the Transformer type or target sets of layers of neural networks that have the ability to execute at least vector-to-vector and/or sequence-to-vector and/or sequence-to-sequence operations.

In fully connected neural networks, each neuron transmits its output signal to other neurons, including itself. All input signals are fed to all neurons. The output signals of the network can be all or some of the output signals of neurons after several clock cycles of the network. In multilayer (layered) neural networks, neurons are combined into layers. The layer contains a set of neurons with common input signals. The number of neurons in a layer can be any and does not depend on the number of neurons in other layers. In general, the network consists of layers numbered from left to right. External input signals are fed to the inputs of the neurons of the input layer (it is often numbered as zero), and the outputs of the network are the output signals of the last layer. In addition to the input and output layers, a multilayer neural network has one or more hidden layers.

Recurrent neural networks (RNN) are a type of neural networks where connections between elements form a directed sequence. This makes it possible to process a series of events in time or consecutive spatial chains.

Unlike multilayer perceptrons, recurrent networks can use their internal memory to process sequences of arbitrary length. Therefore, RNNs are applicable in such tasks where something integral is divided into segments, for example, handwriting recognition or speech recognition. Many different architectural solutions have been proposed for recurrent networks, ranging from simple to complex ones. Recently, the long-term and short-term memory network (LSTM) and the controlled recurrent unit (GRU) have become the most widespread.

Neural networks began to be used for a variety of user tasks. In particular, the solution of the problems of predicting user data through trained perceptrons has gained great importance. Further, we will dwell in detail on one of the possible implementations of the method for automated prediction of user data using the proposed technologies.

The method 200 for automated prediction of user data comprises the main steps (denoted 201-207 in FIG. 1).

At step 201 (ref. num. 201, FIG. 1) at least one processing device obtains user action features, presented as an array of first vectors.

The input receives a vector of user features (an array of user feature vectors, ref. num. 301, FIG. 2)—they change depending on the context in which the technology is used. The main thing is that they do not change in the process of the user performing any actions, i.e. characterize the user himself, not his state. For example: country, city, phone model, advertising source name, etc.

The architecture of the module is dynamically selectable basing on the training data (for example, a fully connected neural network), the main thing is that it takes a vector as input and produces a vector (vector-to-vector, ref. num. 303, FIG. 2) and has the ability to learn by the method back propagation of the error.

At step 202 (ref num. 202, FIG. 1) at least one processing device obtains user features represented as an array of second user feature vectors.

Figure 2:
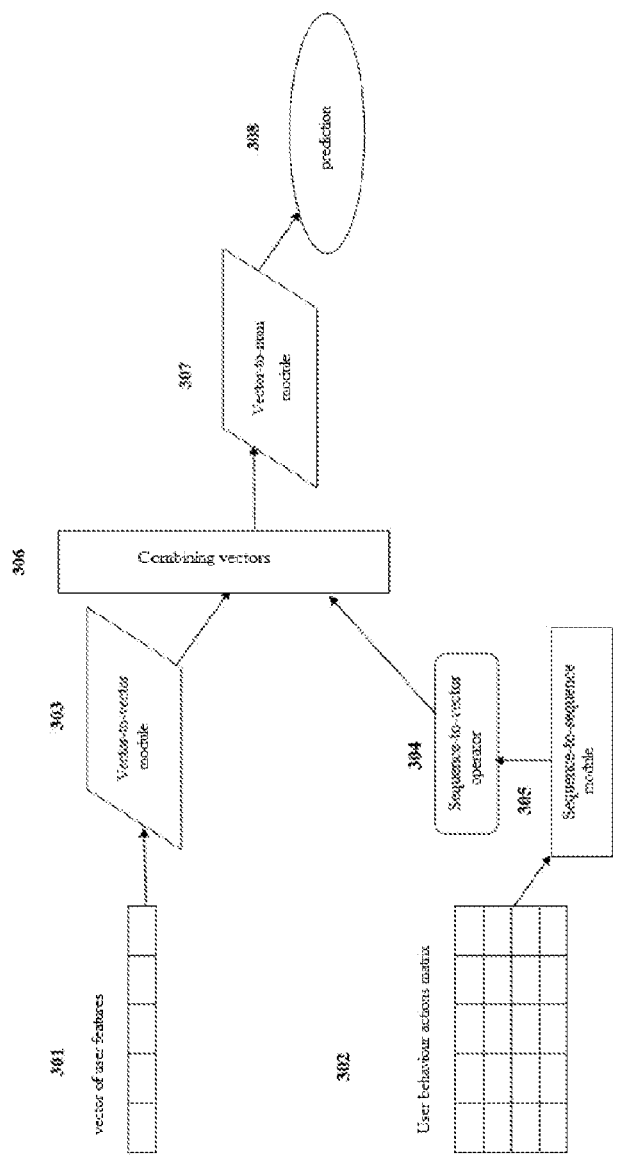
FIG. 2 shows one possible implementation of an automated user data prediction system.

The input receives a matrix consisting of vectors—user actions features (an array of user feature vectors, ref. num. 302, FIG. 2). The set of features may vary depending on the context in which the technology is used. The main thing is that these features characterize the user's action and change from action to action, for example: the time of the event, the name of the event, event attributes (product id, search query, etc.).

The architecture of the module is dynamically selectable basing on the training data, the main thing is that it takes a matrix (sequence of vectors) as input and produces a vector (i.e. sequence-to-vector, ref. num. 305, FIG. 2) and has the ability to learn by the error backpropagation method (for example, a recurrent neural network or Transformer Encoder).

FIG. 2 shows the main modules of one of the possible implementations of the automated user data prediction system (ref. num. 301-308).

At step 203 (ref. num. 203, FIG. 1), at least one neural network model is trained on said arrays of first vectors and second feature vectors, using the error backpropagation method to obtain at least one trained model the output which generates at least one first and second latent state feature vectors, wherein said at least one trainable neural network model is configured to dynamically select an architecture depending on said first and second feature vectors.

For training and testing the solution, for example, raw user behavior data from the Appsflyer tracking system (a SaaS platform for mobile marketing analytics and attribution) can be used. Other data obtained by any known and accessible method can also be used.

The data contains activities such as at least 10,000 unique users.

The data contains actions, for example, at least 3000 unique users who made a conversion (purchase/subscription/view ads/etc.).

The average number of actions performed by the user during the use of the application is at least 10.

Features of Users (Table A).

The historical data is a table in which the columns are event attributes, and the rows are events performed by the user of the application.

At the output of the algorithm, two processed tables are obtained: a table with user features (ref. num. 301, FIG. 2) and a table with event features (ref. num. 302, FIG. 2).

For training, data was taken for some period remote from the current moment (for example, data of users attracted 6 months ago), actual metrics were calculated for them (for example, the amount of user purchases), and data on the behavior in the first few days was used for the model input. Thus, the model was trained to predict long-term user metrics basing on its primary behavior.

The following features are taken into account from the source table for each user:
User ID, e.g. mobile measurement platform (MMP) ID;
Application ID;
The code of the region in which the user performed the first action;
Media source—the name of the advertising source to which the user attraction is attributed;
contributor_1/2/3_media_source are names of three advertising sources involved in user acquisition;
The time of day at which the setting was made;
Day of the week on which the setting was made;
The number of days the user logged into the application;
Average number of user actions per hour;
Number of seconds elapsed from moment of setting to the current moment;
Whether the conversion has occurred so far;
The number of times the set of the most popular events in the application was committed (events that occur in more than 5% of cases fall into the set).

The result is a table with the features of each user, size P×K, where P is the number of users, and K is the number of user features (listed above).

At step 204 (ref. num. 204, FIG. 1) the combination of said arrays of first and second latent state feature vectors is performed by at least one processing unit.

Event Features (Table E)

The combination of outputs of the User-level and Event-level modules, i. e. also a vector (ref. num. 306, FIG. 2) is received at the input of at least one processing unit.

The architecture of the module can be dynamically selected basing on the training data (for example, a fully connected neural network), the main thing is that it takes a vector as input and produces a vector (vector-to-vector, ref. num. 303, FIG. 2) and has the ability to learn by the error backpropagation method.

The following features are taken into account from the source table for each event:
The user ID in the MMP system who performed this action (to combine with the first table);
Event name;
The time of the event;
Type of network used at the time of the event (wifi/mobile internet);
The amount of income from the event (for purchase events);
Number of seconds from the setting to this event;
Dynamically created features based on Event Value of the event;
Event Value is a field of key:value type (dictionary) in a table with historical data. This field can contain any data that the client sends from his application. In this case, the algorithm takes all the keys that appear in the data and makes them the features of the event. At the same time, keys are excluded in which there are a lot of missing values, or the values are not suitable for building a model.

The result is a table with the features of each event, size M×N, where M is the total number of events, and N is the number of event features (listed above, may vary due to the last paragraph).

Further, the data in tables A and E are encoded in numerical format depending on the type of data in each individual column:
Columns with lines that have a large number of unique values are encoded, for example, using the Embedding algorithm (the embedding algorithm is mapping of an arbitrary entity: for example, a node in a graph or a piece of a picture to a certain vector);
Columns with lines having a small number of unique values are encoded, for example, according to the One Hot Encoding algorithm;
Columns with numbers are mapped to a suitable space using Min Max Scaling;
Columns with arrays of lines are encoded according to the modified One Hot Encoding algorithm: at the output, the vector corresponding to the array of lines has the number of non-zero values equal to the number of values in the original array, wherein the values in the vector are equal to the number of repetitions of this value in the original array.

Columns with arrays of numeric values are used to calculate a set of statistical values:

Arithmetic mean;
Median;
Minimum;
Maximum;
Amount;
Standard deviation;

Calendar date columns are encoded into periodic values by taking the sine and cosine of the following parts of the date:

Day of the week;
Day of month;
Hour number in a day;
Minute number in an hour.

At step 205 (ref. num. 205, FIG. 1), at least one neural network model is created and trained on said combined first and second latent state vectors, using the error backpropagation method, wherein said at least one neural network model is configured to dynamically select an architecture depending on said combined first and second latent state feature vectors;

wherein, the choice of architecture depends on one or more of:
the dimensions of the obtained vectors; distribution of features contained in the vectors.

Once trained, the neural network can be used to automatically predict user data. In some embodiments, a neural network may be used to automatically predict user data. Mechanisms for predicting user data described herein can improve user data prediction by performing user action metric determination by a predictive user action model using a trained neural network in a manner that takes into account dynamic architecture selection dependent on said combined first and second latent state feature vectors.

In a preferred embodiment of the invention, the neural networks used for training comprise one or more recurrent neural networks, which are very well suited for prediction tasks, since these networks include feedback, i.e. the generated outputs are fed back into the neurons of the network as inputs.

Various structures of recurrent neural networks are known, and a preferred embodiment of the invention may use known Elman-type networks as recurrent networks to be trained. At the same time, non-recurrent networks can also be used in the proposed technologies, in particular, the so-called perceptrons.

Here is an example of training an Elman recurrent neural network.

The equations describing the internal state and output of the network, which is obtained as a result of the deployment of the Elman network in time, are as follows:

$$a^{(t)}=Ux^{(t)}+Wh^{(t-1)}+b,$$

$$h^{(t)}=f(a^{(t)})=f(Ux^{(t)}+Wh^{(t-1)}+b),$$

$$o^{(t)}=Vh^{(t)}+c, \check{y}^{(t)}=g(o^{(t)})=g(Vh^{(t)}+c),$$

where U, W, V are weight matrices,
b, c are shift vectors,
$h^{(t)}$ is vector of latent variables at time t
(when processing an example with number t from a given input sequence),
$\check{y}^{(t)}$ is network output at time t,
$f(\cdot), g(\cdot)$ are activation functions The task of training the Elman network is to minimize the total error over all examples of available sequences.

A recurrent neural network can be deployed in time, thereby presenting it as a network with direct signal propagation. The error backpropagation through time (BPTT) method can be used to train network parameters, it is a gradient-based method for training certain types of recurrent neural networks; it can be used to train Elman networks).

Forward pass along the time-deployed network (pass from left to right along the time-deployed network):

Computation of latent states and expanded network outputs, as well as gradients of activation functions is performed;

Computational complexity is proportional to the length of the input sequence;

Parallelization of calculations cannot be performed, since each subsequent internal state of the system depends on the previous one.

Calculation of the value of the objective function and the gradient of this function.

Reverse pass of the time-deployed network (pass from right to left along the time-deployed network). The error is calculated and the network weights are adjusted.

Neural networks can be trained by any well-known method. In a preferred embodiment of the invention, a weight optimization method is used for training that optimizes the synaptic weights of neurons, preferably the l-BFGS algorithm (limited-memory Broyden-Fletcher-Goldfarb-Shanno algorithm), which is an approximation of the BFGS algorithm with asymptotics of the memory used linear with respect to the length of the input data well known in the art. This algorithm belongs to the quasi-linear ones. It not only takes into account the derivative of the objective function, but also approximates its Hessian, which leads to faster convergence. In addition, one of the important parts of the algorithm is a linear search, which must be based on the Wolfe conditions.

The preferred method for training neural networks in this disclosure is the error backpropagation algorithm. This method is classified as a supervised learning method, so it is required to set target values in the training examples.

When training neural networks using the error backpropagation method, two passes are used through all layers of the neural network: forward and backward. When performing a direct pass, the input vector is fed to the input layer of the network, after which it propagates through the neural network from layer to layer. As a result, a set of output signals should be generated—it is, in fact, the reaction of the neural network to this input image. With a forward pass, all synaptic weights of the neural network are fixed. In the backward pass, all synaptic weights are adjusted according to the error correction rules, when the actual output of the neural network is subtracted from the desired one, which leads to the formation of an error signal. Such a signal further propagates through the network, wherein the direction of propagation is opposite to the direction of synaptic connections. Synaptic weights are adjusted to bring the output of the neural network as close as possible to the desired one.

The goal of training a neural network using the error backpropagation algorithm is such an adjustment of the neural network weights, which will allow, when applying a certain set of inputs, to obtain the required set of outputs of neurons (output neurons). We can call these arrays of inputs and outputs vectors. In the learning process, it is assumed that for any input vector there is a target vector that is paired with the input and specifies the required output. This pair is called a training pair. Working with neural networks, we train them on many pairs.

This algorithm uses stochastic gradient descent and moves in the multidimensional weight space in the direction of the anti-gradient, with the goal being to achieve a minimum of the error function.

In the practical application of the method, training is continued not until the most accurate adjustment of the neural network to the minimum of the error function, but until a fairly accurate approximation of it is reached. On the one hand, this makes it possible to reduce the number of training iterations, on the other hand, to avoid retraining the neural network.

This method is based on calculating the error surface gradient vector, which indicates the direction of the shortest descent along the surface from a given point. The sequence of steps leads after a number of iterations to a minimum of the error surface. The obvious difficulty here is the choice of stride length. With a large length, convergence is faster, but there is a danger of "jumping" over the solution, especially in cases where the response surface has the shape of a narrow ravine. With a small step, the direction of advance is chosen correctly, but many iterations are required to reach the minimum. In practice, the step size is assumed to be proportional to the steepness of the slope with some constant, called the learning rate.

At each epoch, all training observations are fed into the network in turn, the output values of the network are compared with the target values, and the error is calculated. The error value, as well as the gradient of the error surface, are used to adjust the weights, after which all actions are repeated. The learning process stops either when a certain number of epochs have been passed, or the error has reached a certain level or stops decreasing altogether.

However, other well-known training methods can also be used to train neural networks.

In another embodiment of the invention, said one or more neural networks comprise a plurality of neural networks having a common output to derive an averaged output of said at least one output of said plurality of neural networks, thereby resulting in better prediction results.

At step 206 (ref. num. 206, FIG. 1), at least one processing unit displays data of the combined said first and second latent state feature vectors by a given encoding algorithm, depending on the type of said data and the number of received unique values, with the creation of an encoder made in the form of at least one neural network model, actions of at least one user based on features of actions performed by at least one user.

At step 207 (ref. num. 207, FIG. 1) automated prediction of the metrics of user actions by the obtained predictive model of the actions of at least one user is performed.

After processing the data, a predictive model is automatically created (ref. num. 308, FIG. 2), which takes all of the above parameters encoded in numbers (ref. num. 307, FIG. 2).

Creating a Model

The model is created as a hybrid of a fully connected neural network and an encoder from the Transformer architecture.

It is worth noting that such a hybrid connection is not a limiting implementation option. Other connections of neural network models that can perform similar functionality may be involved. So, without being limited, a connection of fully connected and fully connected networks can be used; fully connected and LSTM (Long Short Term Memory Network) networks; LSTM and LSTM and others, such as recurrent networks without constraints.

A Transformer network is a type of neural network that is aimed at solving sequences with dependency processing. Thus, transformers do not process sequences in order—they are able to immediately focus on the necessary data elements thanks to the "attention mechanism". The same mechanism allows the transformer to choose the appropriate response based on the context of the input information, for example, for synonymous words. This allows you to increase the learning rate of such a neural network.

The main components of transformers are an encoder and a decoder. The first one transforms the input information (for example, text) and converts it into a vector (set of numbers). The second one deciphers the vector as a new sequence (for example, the answer to a question), but from words in another language.

Transformer is a model that uses attention to increase speed. More specifically, this model uses self-attention.

Each encoder is very similar to each other. All encoders have the same architecture. Decoders share the same property, i.e. they are also very similar to each other. Each encoder consists of two layers: self-attention and a forward neural network.

Encoder input data first passes through a self-monitoring layer. This helps the encoder look at other words in the input sentence as it encodes the particular word. The decoder has both of these layers, but in between there is the attention layer, which helps the decoder focus on the relevant parts of the input sentence.

Fully-Connected Network

The size of the input and subsequent layers is chosen equal to the number of features in table A (K features).

The number of layers is selected iteratively:

If during training there is no decrease in the error on the training set (underfitting), the number of layers is increased by one.

If during training there is a decrease in the error on the training set with an increase in the error on the validation set (overfitting), the number of layers is reduced by one.

The number of layers is initially assumed to be 2.

Transformer Encoder

The size of the input and subsequent layers is chosen equal to the number of features in table E (N features).

The number of layers and heads is selected iteratively:

When observing underfitting, the number of heads in the encoder is first increased, then the number of layers is increased.

When observing overfitting, the number of heads in the encoder is first reduced, then the number of layers is reduced.

Up/Down Corridor:

The number of heads varies from 1 to 4;

The number of encoder layers varies from 1 to 2.

At each iteration, the model is trained, for example, on a subsample of about 2000 users over 10 epochs.

Iterations continue until the set of historical data is completed.

Combining the outputs of modules (ref. num. 306, FIG. 2)

The output of each module is a vector of top-level user information. Let's call them: vector V of size X and vector W of size Y. These vectors are mapped to the target value in one of two ways:

The vectors are "bonded" into a common vector of size X+Y. This vector is mapped to the target value by a fully connected neural network of two layers. Layer size=X+Y.

Vectors are multiplied as X×1 and 1×Y matrices. It turns out a matrix of size X×Y. This matrix is split into rows, which are "bonded together" into a vector of size X*Y. This vector is mapped to the target value by a fully connected neural network of two layers. Layer size=X*Y.

The proposed solution is expedient, for example, when conducting any performance marketing activities (attracting profitable users), because it makes it possible to predict any metrics of performance marketing and advertising campaigns (MRR, RR, LTV, ROI, CAC, AOV, DAU and many others).

This may also include:

User acquisition;

Retargeting;

Analysis of the application's current audience for future payback.

Let's give an example of building a predictive model for user metrics—DAU—the number of active users of the application in one day.

The data was obtained from a study that generated a virtual user model database consisting of 6000 observations for which the values of 21 input parameters of selected users are known.

We divide the constructed model database into two samples—training and control. As a test set, we will consider the data of real users of specific applications, the prototype of which formed the basis for generating the model base. The third stage is the construction and training of the neural network.

A network was built that, when trained, minimizes the quadratic error on the training set using a gradient. The estimation gradient was calculated by the duality method, namely, the error backpropagation method, which is a gradient descent algorithm. The activation function is the logistic function, and the error function is the root mean square. To select the minimum number of neurons and determine the structure of the network, a contrasting procedure was used.

If an error on the training set is not satisfactory, then it is necessary to go back and change the training sample or the network training method. The fourth stage is testing and using the neural network. For testing, a test sample is used and the classification values are analyzed. If the network is trained incorrectly and the classification results are unsatisfactory, it is necessary to change the network architecture.

In this example, the following can be used: a fully connected neural network, a recurrent neural network, a Transformer type network.

Next, the number of neural network weights is specified. Having estimated the required number of weights, we can calculate the number of neurons in the latent layers.

It is possible to remove latent elements with low output weights by specifying a threshold and input elements with low sensitivity after training the network. In this case, when building a network, the goal is the most accurate result.

After training the neural network and creating a predictive model, we obtain a data table with user input values (financial coefficients), the original membership class, the predicted class, the values of the confidence levels by class, the values of the elements of the encoding vector by the number of input parameters, and the winning neuron. The output of these or those listed parameters can be varied.

It is also possible to output a classification error matrix and a table of classification results. The classification error matrix displays all the information about how many objects of each of the observed classes of the dependent variable are assigned to one or another class according to the classification results. The table also shows the size of the training sample.

Thus, a predictive model is created, through which automated prediction of the activity metric of application users is carried out. In this model, one can set user values for financial indicators, classify a given or selected observation according to the built neural network model. The model makes it possible to view the predicted levels of user confidence by class, the encoding vector of the input parameters, the winning neuron, and the input parameter values. Note that confidence values cannot be interpreted as estimates of probabilities. If they go beyond the threshold values (the class is not predicted), then the activation levels do not reflect the probability of belonging to the class, but the measure of the classification error. For all users of the test sample, the confidence values are not greater than the lower limit or not less than the upper one. This means that the levels of trust reflect the user's belonging to a high category of activity.

FIG. 3 shows an example of one possible implementation of a comparative analysis of the automated user data prediction system and the Deep Learning Inference Benchmark system.

The Deep Learning Inference Benchmark system (hereinafter referred to as the Benchmark system) makes it possible to evaluate and compare the performance of a neural network after it has been trained.

In order to effectively train models, it is necessary to have a way to evaluate how well a particular model works—for example, it predicts user metrics. Each model has an error function that shows how well the model fits the empirical values. To evaluate already built models, it is not the error function that is used, but the so-called performance metrics—special functions that show how effective a ready-made, trained model is.

The error function is needed primarily to formalize the learning process of the model. That is, in order to select the model parameters exactly so that the model matches the real data in the training sample as much as possible. Indeed, the value of this function can be used as some assessment of the quality of the model after it has been trained, but this is not convenient.

The error function is needed to formalize the deviations of the values predicted by the model from the real ones. For example, in the linear regression method, the error function (mean square deviation) is used for the gradient descent method. Therefore, the error function must necessarily be differentiable everywhere. This requirement–differentiability—is needed only for the optimization method, that is, for training the model.

Next, consider in detail the example of a possible implementation presented in FIG. 3. We will build a neural network of the Transformer type and/or a recurrent neural network that will be trained using the error backpropagation model and/or using the Levenberg-Marquard algorithm. In this example, 5 datasets were also used—examples of user metrics datasets for predicting data and user actions, respectively. Next, predictive model A will be built. Datasets can be selected from at least the following: first, second, third user data that was used in at least the following applications: application A, application B, application C, and so on. Other data than those listed here can be used as user data sets.

For example, the first set of user data may contain a prediction of the amount of the user's purchases for 1 month after installing the online store application for home goods. For this set, the values of R2—the coefficient of determination, MAE—the arithmetic mean error of the Benchmark system, as well as R2, MAE of the predictive model A, % change of R2, % change of MAE are calculated.

According to this example, at least the following indicators were analyzed for the Benchmark system, for the created predictive model: MAE—arithmetic mean error, R2—coefficient of determination.

The coefficient of determination R2 is related to the arithmetic mean error MAE. These two relationships are interrelated:

$$R2=1-MSE/(\text{variance of inputs}) \quad MSE=(\text{variance of inputs})*(1-R2)$$

Since the variance of the input data does not change as the network trains, the coefficient of determination will be linearly related to the rms error. This means that using R2 instead of MSE will most likely not change the way the network is trained. Which metric is to be chosen depends a lot on the situation as they represent different things. However, if all you want is a number that changes over time to show how well trained your network is, they will both work. It should be noted that MSE is a minimization function, i.e. it approaches 0 as your network improves, whereas R2 is a maximization function that approaches 1 as your network improves. If you are using back propagation, you will need to take this into account when calculating the gradient. Thus, the example shown in FIG. 3 solves the problem of evaluating the performance of the trained neural network, which, among other things, provides a reduction in the arithmetic mean error and an increase in the coefficient of determination of the constructed predictive model.

According to the evaluation results shown in FIG. 3, on average, the use of this method can reduce the arithmetic mean error (MAE) by 19% and increase the coefficient of determination (R2) by 23%. These are quite high indicators of the efficiency of the constructed predictive model A, considered in this example. The above example was tested experimentally and shows that the constructed neural network will effectively predict user data, with all other things being equal.

Figure 4:
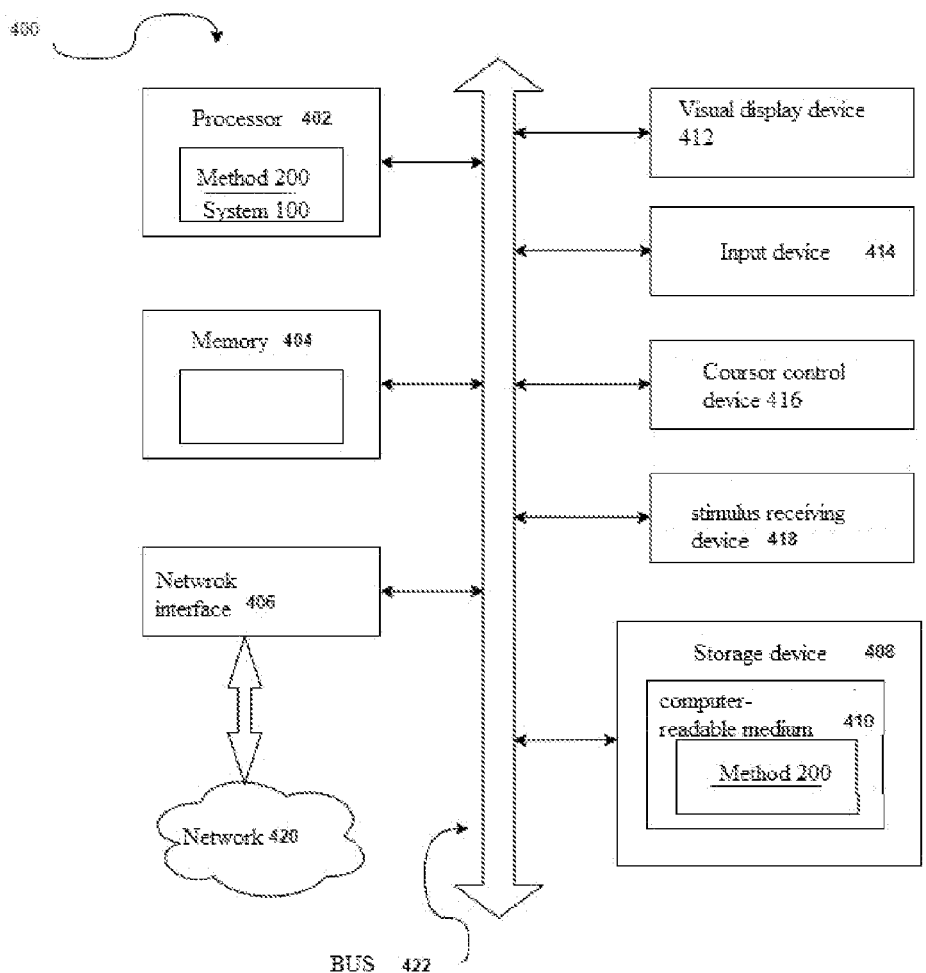
FIG. 4 shows one possible implementation of a computer system in accordance with some embodiments of the present invention.

FIG. 4 shows an example of one possible implementation of a computer system 400 that can perform one or more of the methods described herein.

The computer system may be connected (e.g., over a network) to other computer systems on a local area network, an intranet, an extranet, or the Internet. The computer system may operate as a server in a client-server network environment. A computer system may be a personal computer (PC), a tablet computer, a set-top box (STB), a personal digital assistant (PDA), a mobile phone, or any device capable of executing a set of instructions (sequential or otherwise) that specifies actions to be performed by this device. In addition, while only one computer system is illustrated, the term "computer" should also be understood as any complex of computers that individually or collectively execute a set (or multiple sets) of instructions to perform any one or more of the methods described herein.

The exemplary computer system 400 consists of a data processor 402, random access memory 404 (e.g., read only memory (ROM), flash memory, dynamic random access memory (DRAM) such as synchronous dynamic random access memory (SDRAM)) and data storage devices 408 that communicate with each other via a bus 422.

The data processor 402 is one or more general purpose processing units such as a microprocessor, a central processing unit, and the like. The data processor 402 may be a full instruction set computing (CISC) microprocessor, a reduced instruction set computing (RISC) microprocessor, a very long instruction word (VLIW) microprocessor, a processor implementing other instruction sets, or a processor implementing a combination of instruction sets.

The data processor 402 may also be one or more special purpose processing devices such as an application specific integrated circuit (ASIC), a field programmable gate array (FPGA), a digital signal processor (DSP), a network processor, etc. The data processor 402 is configured to execute instructions 430 to perform steps of a method 200 and a system 100 designed for performing a trusted boot of an operating system (OS) image with a mechanism to share boot step verification functions among multiple key owners, and to perform any of the operations described above.

The computer system 400 may further include a network interface 406, a display device 412 (e.g., a liquid crystal display), an alphanumeric input device 914 (e.g., a keyboard), a cursor control device 416, and an external input device 418. In one embodiment, the display device 412, the alphanumeric input device 414, and the cursor control device 416 may be combined into a single component or device (e.g., a touch-sensitive liquid crystal display).

The stimulus receiving device 418 is one or more devices or sensors for receiving an external stimulus. A video camera, a microphone, a touch sensor, a motion sensor, a temperature sensor, a humidity sensor, a smoke sensor, a light sensor, etc. can act as a stimulus receiving device.

Storage device 408 may include a computer-readable storage medium 410 that stores instructions 430 embodying any one or more of the techniques or functions described herein (method 200). The instructions 430 may also reside wholly or at least partially in RAM 404 and/or on the data processor 402 while they are being executed by computer system 400. RAM 404 and the data processor 402 are also computer-readable storage media. In some implementations, instructions 430 may additionally be transmitted or received over network 420 via network interface device 406.

Although in the illustrative examples the computer-readable medium 410 is represented in the singular, the term "machine-readable medium" should be understood as including one or more media (for example, a centralized or distributed database and/or caches and servers) that store one or more sets of instructions. The term "machine-readable medium" should also be understood to include any medium capable of storing, encoding, or carrying a set of instructions for execution by a machine and causing the machine to perform any one or more of the techniques of the present invention. Therefore, the term "computer-readable medium" should include, but is not limited to, solid-state storage devices, optical and magnetic storage media.

Although the steps of the methods described herein are shown and described in a specific order, the order of steps of each method can be changed so that certain steps can be performed in reverse order, or so that certain steps can be performed at least partially simultaneously with other operations. In some implementations, instructions or sub-operations of individual operations may be intermittent and/or interleaved.

It should be understood that the above description is illustrative and not restrictive. Many other embodiments will become apparent to those skilled in the art upon reading and understanding the above description. Therefore, the scope of the invention is determined by reference to the appended claims as well as to the full scope of equivalents in respect of which such claims give the right to claim.

In the above description, numerous details are set forth. However, one skilled in the art will appreciate that aspects of the present invention may be practiced without these specific details. In some cases, to avoid obscuring the present invention, well-known structures and devices are presented in block diagram form rather than in detail.

It should be noted that in the absence of other specific indications, as became apparent from the following discussion, throughout the description, such terms in the discussion as "obtaining", "determining", "selection", "storage", "analysis" and etc., refer to the activities and processes of a computer system or similar electronic computing device that manipulates data and converts data represented as physical (electronic) quantities in the registers and memory of a computer system into other data similarly represented as physical quantities in the memory or registers of a computer system or other such devices for storing, transmitting or displaying information.

The present invention also relates to a device for performing the operations described herein. This device may be specially designed for the desired purpose, or may include a general purpose computer selectively activated or reconfigured by a computer program stored in the computer. Such a computer program may be stored on a computer-readable storage medium, such as any type of disk, including floppy disks, optical disks, compact disks and magnetic optical disks, Read Only Memory (ROM), Random Access Memory (RAM), Programmable Read Only Memory (RAM), programmable read-only memory (EPROM), electronically reprogrammable read-only memory (EEPROM), magnetic or optical cards, or any type of media suitable for storing electronic instructions, each connected to a computer system bus.

The algorithms presented herein are not inherently associated with a specific computer or other device. Various general purpose systems may be used with programs in accordance with the teachings herein, or it may be more convenient to create a more specialized device to perform the required method steps. The required structure for a variety of such systems will be as indicated in the description. In addition, aspects of the present invention are not described with reference to a specific programming language. It should be borne in mind that various programming languages can be used to implement the provisions of the present invention, as described in this document.

Embodiments of the present invention may be in the form of a software product or software including a computer-readable medium with instructions stored thereon that may be used to program a computer system (or other electronic devices) to perform the process in accordance with the present invention. A computer-readable medium includes any mechanism for storing or transmitting information in a form that is readable by a machine (e.g., a computer). For example, a computer-readable (e.g., computer-readable) medium includes a computer-readable (e.g., computer-readable) storage medium (e.g., read only memory (ROM), random access memory (RAM), magnetic disk storage medium, optical storage medium, flash memory).

The words "example" or "given as an example" in this document means an example, case or illustration. Any aspect or solution described herein as "example" or "given as an example" should not necessarily be construed as preferable or advantageous over other aspects or solutions. Rather, the use of the words "example" or "exemplary" is intended to present concepts from a practical point of view. As used in this application, the term "or" is intended to mean an inclusive "or" and not an exclusive "or". In addition, the use of the terms "implementation", "single implementation", "exemplary implementation" or "single implementation" throughout the text does not mean the same embodiment or implementation example, unless they are described as such. In addition, the terms "first", "second", "third", "fourth", etc., used in this document are intended to refer to various elements and do not necessarily have an ordinal value in accordance with their numerical designation.

While many amendments and modifications to the invention will no doubt become apparent to one of ordinary skill in the art, upon reading the foregoing description, it should be understood that any particular embodiment shown and described by way of illustration is in no way should be considered limiting.

Therefore, references to the details of various embodiments are not intended to limit the scope of the claims, which by themselves contain only features considered as a disclosure of the invention.

Thus, the disclosed embodiments of the present invention can at least improve the performance of user data prediction. And also, they provide a decrease in the arithmetic mean error (MAE) and an increase in the coefficient of determination ($R2$) of trained neural networks.

What is claimed is:

1. A method for automated prediction of user data, comprising:
    a) obtaining, by at least one processing unit, user action features, represented as an array of first vectors;
    b) obtaining, by at least one processing unit, user features, represented as an array of second user feature vectors;
    c) creating a predictive model of actions, the predictive model of actions comprising:
        at least one user action features encoder made in the form of at least one neural network model;
        at least one user feature processing model, wherein said at least one user feature processing model is made in the form of at least one neural network model and configured to dynamically select an architecture depending on one or more of: dimensions of the input data, distribution of features contained in the input data;
        at least one user prediction model, wherein said at least one user prediction model is made in the form of at least one neural network model and configured to dynamically select an architecture depending on one or more of: dimensions of the input data, distribution of features contained in the input data;
    d) training the predictive model of actions using an error backpropagation method, including the following steps;
        feeding, by at least one processing unit, the array of first vectors to the user action features encoder to generate at least one first latent state action feature vector of at least one user;
        feeding, by at least one processing unit, the array of second user feature vectors to the feature processing model to generate at least one second latent state user feature vector of at least one user;
        concatenating, by at least one processing unit, said first latent state action feature vector and second latent state user feature vector;

feeding, by at least one processing unit, the concatenation of first latent state action feature vector and second latent state user feature vector to the at least one user prediction model to generate a predicted value of the user data of at least one user;

optimizing, by at least one processing unit, a difference between the predicted value of the user data of at least one user and a respective actual value of the user data of at least one user using an error backpropagation method for all components of the predictive model of actions, wherein the respective actual value of the user data is obtained from the user action features;

e) performing automated prediction of the user data by means of the obtained predictive model of actions of at least one user.

2. The method according to claim 1, wherein the user action features, represented as an array of first vectors, contains at least such values as mobile measurement platform (MMP) ID associated with a user who performed the action; the name of the action; the time of the action; the type of network used during the action; the number of seconds from determining this action; action dynamic parameters.

3. The method according to claim 1, wherein the user features, represented as an array of second user feature vectors, contains at least such values as the user-associated MMP ID; application ID; the number of days the user logged into the application; the total number of user actions; the number of seconds elapsed from the moment the application was installed till the last user action in the application; the number of times a set of the most popular actions in the application was performed.

4. The method according to claim 1, wherein the architecture of said at least one neural network model is dynamically selectable from the trainable neural network models, such as, for example, fully connected neural network models and/or recurrent neural network models and/or Transformer type neural network models or target sets of neural network layers capable of executing at least vector-to-vector and/or sequence-to-vector and/or sequence-to-sequence operations.

5. The method according to claim 1, wherein the at least one user action features encoder is configured to generate a first latent state action feature vector of at least one user from an array of first latent state action feature vectors.

6. An automated user data prediction system comprising one or more processors and one or more storage devices storing instructions that when executed by the one or more processors cause the one or more processors to perform operations comprising:

a) obtaining, by at least one processing unit, user action features, represented as an array of first vectors;

b) obtaining, by at least one processing unit, user features, represented as an array of second user feature vectors;

c) creating a predictive model of actions, the predictive model of actions comprising:

at least one user action features encoder made in the form of at least one neural network model;

at least one user feature processing model, wherein said at least one user feature processing model is made in the form of at least one neural network model and configured to dynamically select an architecture depending on one or more of: dimensions of the input data, distribution of features contained in the input data;

at least one user prediction model, wherein said at least one user prediction model is made in the form of at least one neural network model and configured to dynamically select an architecture depending on one or more of: dimensions of the input data, distribution of features contained in the input data;

d) training the predictive model of actions using an error backpropagation method, including the following steps:

feeding, by at least one processing unit, the array of first vectors to the user action features encoder to generate at least one first latent state action feature vector of at least one user;

feeding, by at least one processing unit, the array of second user feature vectors to the feature processing model to generate at least one second latent state user feature vector of at least one user;

concatenating, by at least one processing unit, said first latent state action feature vector and second latent state user feature vector;

feeding, by at least one processing unit, the concatenation of first latent state action feature vector and second latent state user feature vector to the at least one prediction model to generate a predicted value for the user data of at least one user;

optimizing, by at least one processing unit, a difference between the predicted value for the user data of at least one user and a respective actual value of user data of at least one user using an error backpropagation method for all components of the predictive model of actions, wherein the respective actual value of user data is obtained from the user action features;

e) performing automated prediction of the user data by means of the obtained predictive model of actions of at least one user.

7. The system according to claim 6, wherein the user action features, represented as an array of first vectors, contains at least such values as mobile measurement platform (MMP) ID associated with a user who performed the action; the name of the action; the time of the action; the type of network used during the action; the number of seconds from determining this action; action dynamic parameters.

8. The system according to claim 6, wherein the features, represented as an array of second user feature vectors, contains at least such values as the user-associated MMP ID; application ID; the number of days the user logged into the application; the total number of user actions; the number of seconds elapsed from the moment the application was installed till the last user action in the application; the number of times a set of the most popular actions in the application was performed.

9. The system according to claim 6, wherein the architecture of said at least one neural network model is dynamically selectable from the trainable neural network models, such as, for example, fully connected neural network models and/or recurrent neural network models and/or Transformer type neural network models or target sets of neural network layers capable of executing at least vector-to-vector and/or sequence-to-vector and/or sequence-to-sequence operations.

10. The system according to claim 6, wherein the at least one user action features encoder is configured to generate a first latent state action feature vector of at least one user from an array of first latent state action feature vectors.

11. A non-transitory computer-readable storage medium containing instructions to be executed by at least one processing unit, which, when executed by said at least one processing unit, cause automated prediction of user data through at least the following steps:

a) obtaining, by at least one processing unit, user action features, represented as an array of first vectors;

b) obtaining, by at least one processing unit, user features, represented as an array of second user feature vectors;

c) creating a predictive model of actions, the predictive model of actions comprising:

at least one user action features encoder made in the form of at least one neural network model;

at least one user feature processing model, wherein said at least one user feature processing model is made in the form of at least one neural network model and configured to dynamically select an architecture depending on one or more of: dimensions of the input data, distribution of features contained in the input data;

at least one user prediction model, wherein said at least one user prediction model is made in the form of at least one neural network model and configured to dynamically select an architecture depending on one or more of: dimensions of the input data, distribution of features contained in the input data;

d) training the predictive model of actions using an error backpropagation method, including the following steps;

feeding, by at least one processing unit, the array of first vectors to the user action features encoder to generate at least one first latent state action feature vector of at least one user;

feeding, by at least one processing unit, the array of second user feature vectors to the feature processing model to generate at least one second latent state user feature vector of at least one user;

concatenating, by at least one processing unit, said first latent state action feature vector and second latent state user feature vector;

feeding, by at least one processing unit, the concatenation of first latent state action feature vector and second latent state user feature vector to the at least one user prediction model to generate a predicted value of the user data of at least one user;

optimizing, by at least one processing unit, a difference between the predicted value of the user data of at least one user and a respective actual value of user data of at least one user using an error backpropagation method for all components of the predictive model of actions, wherein the respective actual value of user data is obtained from the user action features;

e) performing automated prediction of the user data by means of the obtained predictive model of actions of at least one user.

12. The computer-readable storage medium according to claim 11, wherein the user action features, represented as an array of first vectors, contains at least such values as mobile measurement platform (MMP) ID associated with a user who performed the action; the name of the action; the time of the action; the type of network used during the action; the number of seconds from determining this action; action dynamic parameters.

13. The computer-readable storage medium according to claim 11, wherein the user features, represented as an array of second user feature vectors, contains at least such values as the user-associated MMP ID; application ID; the number of days the user logged into the application; the total number of user actions; the number of seconds elapsed from the moment the application was installed till the last user action in the application; the number of times a set of the most popular actions in the application was performed.

14. The computer-readable storage medium according to claim 11, wherein the architecture of said at least one neural network model is dynamically selectable from the trainable neural network models, such as, for example, fully connected neural network models and/or recurrent neural network models and/or Transformer type neural network models or target sets of neural network layers capable of executing at least vector-to-vector and/or sequence-to-vector and/or sequence-to-sequence operations.

15. The computer-readable storage medium according to claim 11, wherein the at least one the encoder of user action is configured to generate a first latent state action feature vector of at least one user from an array of first latent state action feature vectors.

* * * * *